United States Patent [19]

Skinner, Sr. et al.

[11] Patent Number: 4,577,221

[45] Date of Patent: Mar. 18, 1986

[54] POWER SAFETY DEVICE FOR CATV TAP-OFF UNIT

[75] Inventors: Russell A. Skinner, Sr., Elizabeth; Walter S. Ciciora, Englewood, both of Colo.

[73] Assignee: American Television & Communications Corporation, Englewood, Colo.

[21] Appl. No.: 676,076

[22] Filed: Nov. 29, 1984

[51] Int. Cl.[4] .............................................. H04N 7/10
[52] U.S. Cl. .......................................... 358/86; 455/3
[58] Field of Search .................... 358/84, 86; 455/2-6; 307/200 A

[56] References Cited

U.S. PATENT DOCUMENTS

| 3,909,560 | 9/1975 | Martin et al. | 455/3 X |
| 4,135,157 | 1/1979 | den Toonder | 358/86 X |
| 4,161,751 | 7/1979 | Ost | 358/114 |
| 4,205,269 | 5/1980 | Watanabe | 358/86 X |
| 4,475,123 | 10/1984 | Dumbauld | 358/86 X |

FOREIGN PATENT DOCUMENTS

| 56-152339 | 11/1981 | Japan | 455/3 |
| 58-38088 | 3/1983 | Japan | 358/86 |
| 59-149748 | 8/1984 | Japan . | |

OTHER PUBLICATIONS

"The Tier Guard System", by e-com Corporation, Quakertown, Pa., brochure #470-0004.
"Just in Time for the Future", by Pico Products, Inc., Liverpool, N.Y., brochure.
"Out-of-Home Addressable Security is Now a Reality" by Vitek Electronics, Inc., Edison, N.J.; drawing dated 2-28-83.
"Scat Series 10 Converter Off-Premises Addressable Control: Second Generation", by Joseph P. Preschutti; C-COR Electronics, Inc., 5/83.

Primary Examiner—Keith E. George
Attorney, Agent, or Firm—Laurence S. Rogers

[57] ABSTRACT

In a cable television system in which one or more tap-off devices deliver television signals to an associated subscriber via drop cables connecting the tap-off devices at the subscribers' premises, and in which the tap-off devices receive electrical power from the subscribers via the drop cables, a power safety apparatus and method interrupts the application of power to the drop cable when the drop cable becomes cut, broken or disconnected to prevent individuals from receiving hazardous electrical shocks.

17 Claims, 7 Drawing Figures

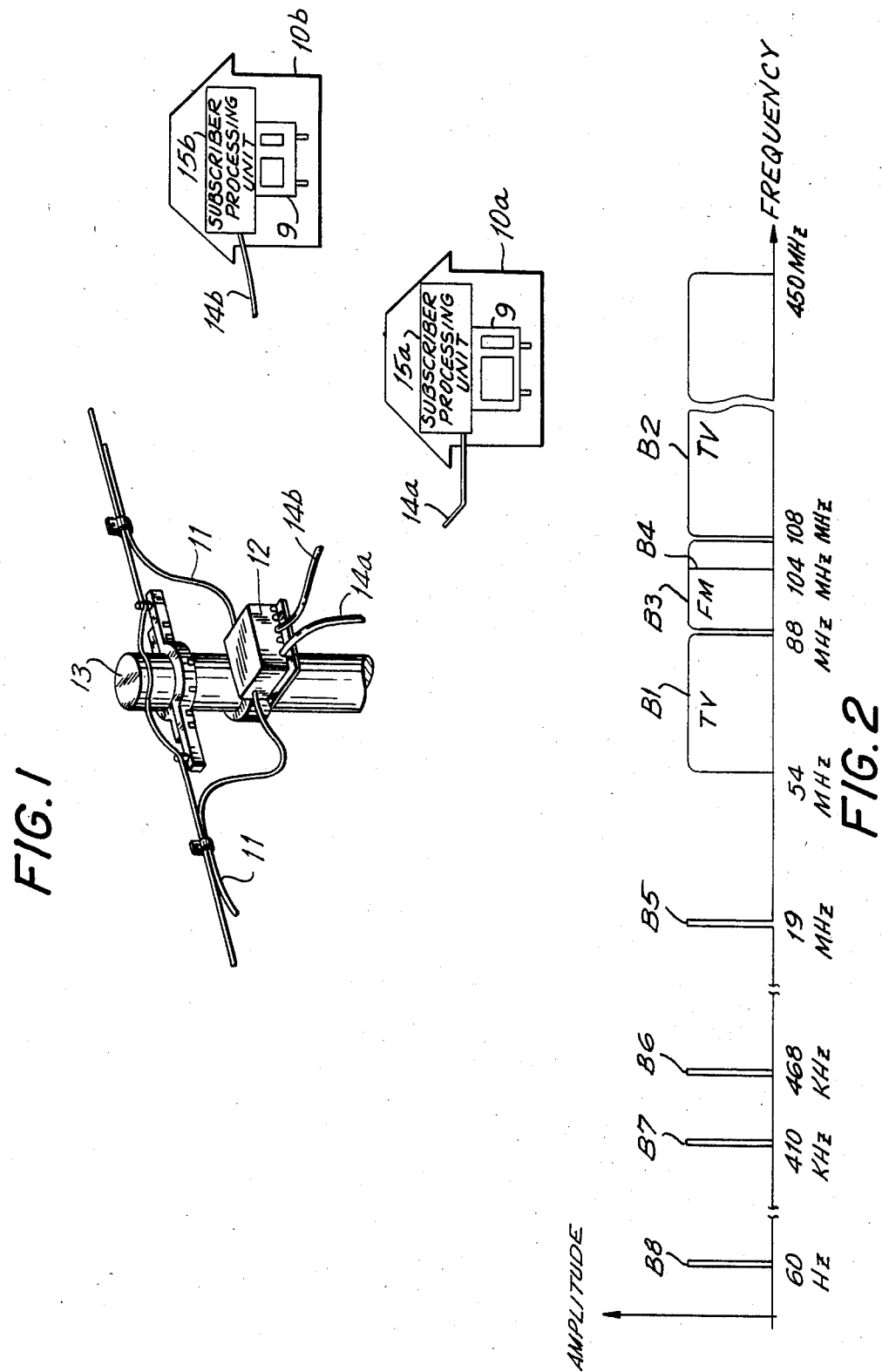

POWER SAFETY DEVICE FOR CATV TAP-OFF UNIT

BACKGROUND OF THE INVENTION

This invention relates to a power safety device for use in a cable television ("CATV") system in which the converter for converting portions of the television signal on the cable network to the television signal which is appied to the subscriber's television receiver, or other electronic circuitry for delivering television signals to the subscriber, is located outside the subscriber's premises, and in which electrical power for the off-premises converter or other electronic circuitry is provided by the subscriber via the subscriber's drop cable.

In a conventional CATV system, when a subscriber contracts with the CATV service company to subscribe to receive desired television channels, the company installs a CATV converter indoors in the subscriber's house. The CATV converter is powered by being plugged into an ordinary AC outlet in the subscriber's home. The entirety of the television signal is delivered via a drop cable into the subscriber's home, and the converter allows selection and viewing of only those portions of the television signal for which the subscriber has contracted.

Delivering the entirety of the television signal to the subscriber creates at least two security problems. First, the subscriber may be able to modify the CATV converter to view CATV programs on nonsubscribed channels, resulting in a loss of revenue to the CATV system operator. Second, the subscriber may move and take the expensive leased CATV converter with him, although the CATV service company is entited to repossess the converter. Again, the CATV service company suffers a loss.

To prevent the misappropriation of CATV services and of CATV converters, the CATV converter or other electronic circuitry (such as circuitry to jam or interdict one or more portions of the television signal) may be placed outside of the subscriber's home, for example in a tap-off device mounted on a telephone pole. However, once the converter unit or other circuitry is installed outside of the subscriber's home, another means must be provided for powering the circuitry.

One way to power the external circuitry is to transmit power signals from the head end or some other point "upstream" of the external circuitry via the cable network. This approach has been used, for example, in conventional systems to power signal distribution ampifiers and tap-off devices placed at various points of the cable network. However, providing power in this manner requires the CATV service company to provide a large amount of electrical power over long distances, and increases the expense and complexity of the cable network.

Another way to power the circuitry of externaly located tap-off devices is to supply power from the subscribers served by the tap-off device. Such power may conveniently be supplied via the drop cables connecting individual subscriber premises to the tap-off device. A power supply device for providing power in this manner is described in commonly assigned U.S. patent application Ser. No. 616,384, entitled "Power Supply System For CATV Tap-Off Unit" and filed May 31, 1984.

Delivering power to external tap-off devices via individual subscriber drop cables, however, can potentially create a safety problem in the event the drop cable connecting the tap-off device to the power supply in the subscriber's house is cut, broken or disconnected. In such an event, the power supply in the subscriber's house would continue to apply electrical power to the cut, broken or disconnected drop cable, thus presenting an electrical shock hazard to individuals advertently or inadvertently coming into contact with the drop cable.

In view of the foregoing, it is therefore an object of this invention to minimize electrical shock hazards assooiated with CATV systems in which at least a portion of the electrical power required to power such systems is supplied by individual subscribers via the drop cables connecting the subscribers to the cable network.

SUMMARY OF THE INVENTION

This and other objects of the invention are accomplished in accordance with the principles of the invention by means of a power safety device associated with each subscriber supplying power to the tap-off device. Each tap-off device transmits a signal to the subscriber's premises via the drop cable connecting the tap-off device to the subscriber's premises. The power safety device is arranged in each subscriber's premises for sensing the transmitted signal on the drop cable. If the transmitted signal is sensed, this indicates that the drop cable is connected to the tap-off device and the subscriber's power supply is enabled to apply full electrical power to the drop cable. If the transmitted signal is not sensed, this indicates that the drop cable is cut, broken or disconnected, and the application to the drop cable of potentially dangerous electrical power is interrupted. As a result, electrical power is applied to the drop cable at a subscriber's premises only if the drop cable is connected from the subscriber's power supply to the tap-off device, thus preventing individuals coming into contact with a cut, broken or disconnected drop cable from receiving a hazardous electrical shock.

BRIEF DESCRIPTION OF THE DRAWINGS

FIG. 1 shows a portion of a CATV system having a tap-off device suitable for use with the invention, the tap-off device including a converter unit and other circuitry for serving a plurality of subscribers, and the tap-off device being powered by electrical power delivered via the drop cables connecting the tap-off device to associated subscriber premises;

FIG. 2 is a graph showing the spectral characteristics of the signals of the CATV system shown in FIG. 1;

DETAILED DESCRIPTION OF THE INVENTION

Figure 3:
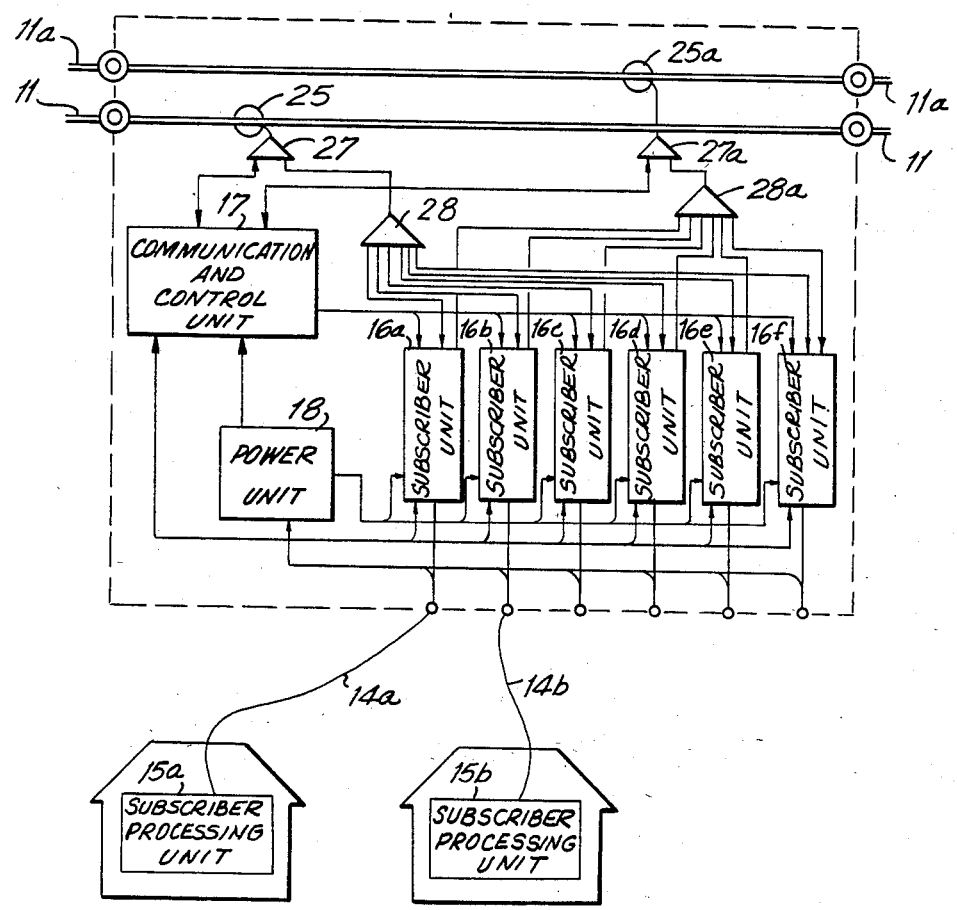
FIG. 3 is an overall block diagram of the internal structure of the tap-off device shown in FIG. 1.

Referring to FIG. 1, reference numeral 11 denotes a feeder cable carrying CATV signals transmitted from a head end (not shown) to an external tap-off device 12 mounted on or adjacent to a utility or telephone pole 13. Tap-off device 12 is one of a plurality of tap-off devices mounted along feeder line 11. Each of a plurality of drop cables 14a, 14b, etc. is connected from tap-off device 12 to a respective one of a plurality of subscriber premises 10a, 10b, etc. Subscriber processing units 15a, 15b, etc. are installed indoors in the subscribers' premises. Each subscriber processing unit 15a, 15b, etc. is utilized by the subscriber to select a TV channel for viewing on the subscriber's television receiver 9. In addition, each subscriber processing unit 15a, 15b, etc. applies electrical power to its associated drop cable 14a, 14b, etc. for powering tap-off device 12. Two subscriber premises and their associated drop cables are illustrated in FIG. 1 as connected to and powering tap-off device 12, but in fact only a single drop cable or more than two drop cables can be connected from tap-off device 12 to one or more than two subscriber premises.

FIG. 2 shows a typical frequency spectrum employed in the CATV system of FIG. 1. A low band B1 of television signals carried on the cable network 11 falls within the range between 54 MHz and 88 MHz, and a high band B2 of television signals carried on the cable network 11 falls within the range between 108 MHz and 450 MHz. Typically, the television signals on as many as 66 channels are transmitted within the ranges of bands B1 and B2. A band B3 of FM audio signals carried on the cable network 11 falls within the range between 88 MHz and 108 MHz. Band B4 at approximately 104 MHz is used for transmitting via the cable network 11 forward data signals from the head end to tap-off device 12. This forward data can be used to control tap-off device 12. Band B5 at approximately 19 MHz is used for transmitting via the cable network 11 reverse data signals from tap-off device 12 to the head end. This reverse data can be used for such purposes as allowing tap-off device 12 to report its status to the head end. Band B6 at approximately 468 KHz is used for transmitting data (e.g., channel selection request data) from each subscriber processing unit 15a, 15b, etc. to the associated tap-off device 12 via the intervening drop cable 14a, 14b, etc. Band B7 at approximately 410 KHz is used for transmitting data (e.g., channel selection confirmation or other data) from tap-off device 12 to the associated subscriber processing units 15a, 15b, etc. via the intervening drop cables 14a, 14b, etc. Finally, band B8 at approximately 60 Hz is used for transmitting an AC power signal from each subscriber processing unit 15a, 15b, etc. to the associated tap-off device 12 via the intervening drop cables 14a, 14b, etc. Of course, other bands (not shown) may be used to transmit other signals.

FIG. 3 shows the internal structure of a typical tap-off device 12 for connection to six subscriber premises. Electrical power for powering tap-off device 12 is received from each attached subscriber premises via drop cables 14a, 14b, etc. The power received from all subscribers is combined in power unit 18, and utilized to power tap-off device 12. Although tap-off device 12 is powered by power received from all attached subscriber premises, the power received from any one subscriber is sufficient to power tap-off device 12.

Six subscriber units 16a, 16b, 16c, 16d, 16e, and 16f, one for each of six subscribers, are arranged in tap-off device 12. Television signals from feeder cable 11 are supplied to subscriber units 16a through 16f via directional coupler 25, two-way distributor 27, and six-way distributor 28. FM audio signals are supplied to subscriber units 16a through 16f via directional coupler 25, two-way distributor 27, and communication and control circuit 17. In addition to feeder cable 11, a second feeder cable 11a can be provided as shown in FIG. 3 to double the number of TV channels available on the CATV system. Feeder cable 11a is connected to subscriber units 16a through 16f via directional coupler 25a and distributors 27a and 28a.

Each of subscriber units 16a through 16f includes converter/tuner circuitry for selecting a desired TV channel from the purality of TV channels present on feeder cables 11 and 11a. When a subscriber depresses a key on his or her subscriber processing unit 15, the subscriber processing unit 15 modulates and transmits a 468 KHz request signal to communication and control unit 17 in tap-off device 12 via the subscriber's drop cable 14 and the corresponding subscriber unit 16. Communication and control unit 17 has a memory for storing individual subscriber data such as data identifying the channels for which each associated subscriber has contracted and is authorized to receive. The individual subscriber data is transmitted from the head end of the CATV system using forward data transmission band B4.

When the request signal from the subscriber is supplied to communication and control unit 17, commuication and control unit 17 demodulates the request signal and detects whether or not the requested channel is a subscribed channel. If the subscriber has subscribed to the requested channel, communication and control unit 17 supplies channel selection data to the converter/tuner contained within the corresponding subscriber unit 16 to cause the requested television channel to be transmitted to the subscriber via the drop cable. Communication and control unit 17 also modulates and transmits a 410 KHz reply signal to the subscriber who requested the television channel. The 410 KHz reply signal includes data identifying the television channel being transmitted to the subscriber. If the subscriber has not subscribed to the requested channel, communication and control unit 17 disables the tuning operation of the converter/tuner to prevent the subscriber from viewing the requested TV channel.

The converter/tuner of each subscriber unit 16a through 16f includes a frequency synthesizer for selecting a particular TV channel from among the plurality of TV channels transmitted on feeder cables 11 and 11a, and for converting the selected cable channel to a particular channel (e.g., channel 3) for transmission to the subscriber's TV set via the associated drop cable.

Figure 4:
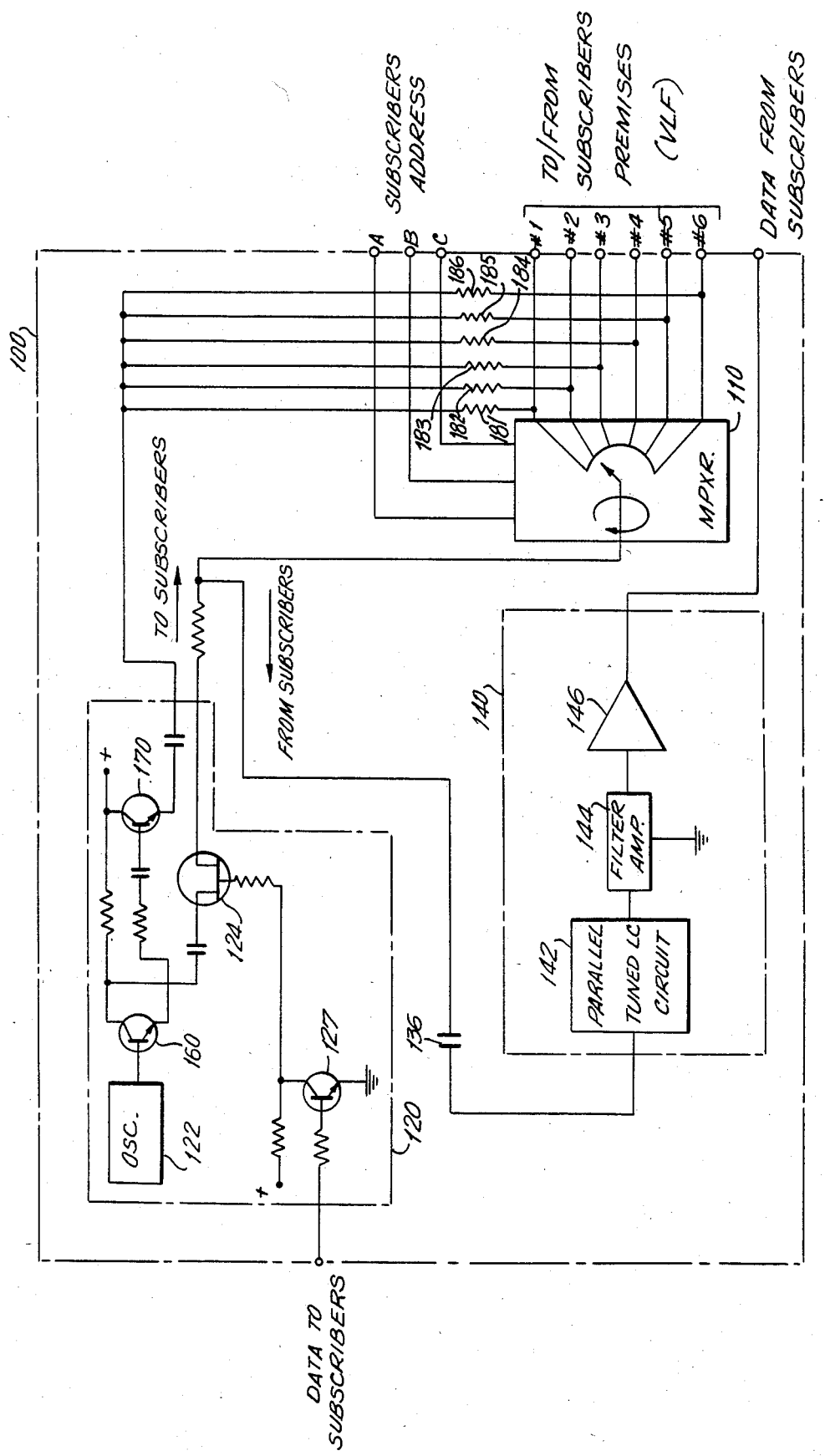
FIG. 4 is a block and circuit diagram of a communication unit in the tap-off device of FIG. 3, the communication unit including a transmitter for transmitting a signal for use with the invention.

FIG. 4 shows communication circuit 100 of communication and control unit 17. Communication circuit 100 facilitates communication of very low frequency ("VLF") data in bands B6 and B7 (FIG. 2) between tap-off device 12 and each associated subscriber processing unit 15. Communication circuit 100 also transmits a signal to associated subscriber premises suitable for use with the power safety device of the present invention.

For facilitating communication between tap-off device 12 and each associated subscriber processing unit 15, communication circuit 100 includes bi-directional multiplexer 110 for connecting a first input/output line to any one of a plurality of second input/output lines as a function of a binary address code appearing on subscriber address lines A, B, and C. Subscriber address lines A, B, and C are connected to the control section of communication and control unit 17 (not shown) to enable the selective connection of any one of the purality of second input/output lines to the first input/output line. Each of the second input/output lines is connected to a respective one of drop cables 14a, 14b, etc. through subscriber units 16a, 16b, etc. (FIG. 3). By presenting different code combinations on address lines A, B, and C, the control section of communication and control unit 17 can select a particular drop cable to enable a particular subscriber to communicate with tap-off device 12.

For receiving communications from subscribers, the first input/output line of multiplexer 110 is connected through capacitor 136 to the input of VLF demodulator 140. VLF demodulator 140 receives VLF-modulated analog signals transmitted from associated subscriber premises at a data rate of 1200 bps (or any other convenient rate) and demodulates those signals into serial digital data for processing by the control section of communication and control unit 17. The VLF signals received from the subscriber premises are on/off amplitude-shift keyed ("ASK") modulated signals having a carrier frequency of 468 KHz. Demodulator 140 includes conventional parallel tuned LC circuit 142, fiter-/amplifier 144, and amplifier 146. The output of VLF demodulator 140 is mark ("1") and space ("0") data. These data are applied to the control section of communication and control unit 17 for processing of the received data.

For communication from tap-off device 12 to subscriber processing units 15a, 15b, etc., data from the control section of communication and control unit 17 are applied to VLF modulator 120. In one embodiment, VLF modulator 120 modulates digital data signals received at a data rate of 1200 bps (or any other convenient rate) into an on/off ASK analog VLF signal having a carrier frequency of 410 KHz. In operation of VLF modulator 120, data from the control section of communication and control unit 17 turn on and off transistor 127, which in turn controls on and off FET transistor switch 124. A continuous 410 KHz carrier signal is produced by conventional crystal-controlled oscillator 122. This signal is applied to the base of transistor 160. Transistor 160 is connected such that the carrier signal appears at the collector of transistor 120 shifted 180° relative to the carrier signal appearing at the transistor's emitter. The collector carrier signal is switched on and off by FET transistor switch 124 in accordance with the VLF data to be transmitted to a subscriber. This switched carrier signal is applied to the first input/output line of multiplexer 110 for transmission to one of the plurality of subscriber premises. The continuous carrier signal appearing at the emitter of transistor 160 is applied to all of the second input/output lines of multiplexer 110 via transistor 170 and resistors 181-186. In this way, 410 KHz carrier is continuously applied to all of the second input/output lines of multiplexer 110, and transmitted to all subscriber premises via the drop cables, except when the carrier on one of those lines is cancelled by the out-of-phase switched carrier (representing data) from transistor switch 124. At a data rate of 1200 bps, a space bit is represented by the absence of carrier for less than 1 millisecond.

Although not necessary for an understanding of the present invention, additional background information regarding the CATV system shown in FIGS. 1–4 will be found in commonly assigned U.S. patent application Ser. Nos. 615,957, 616,384, 616,411 and 616,412, filed May 31, 1984.

Figure 5:
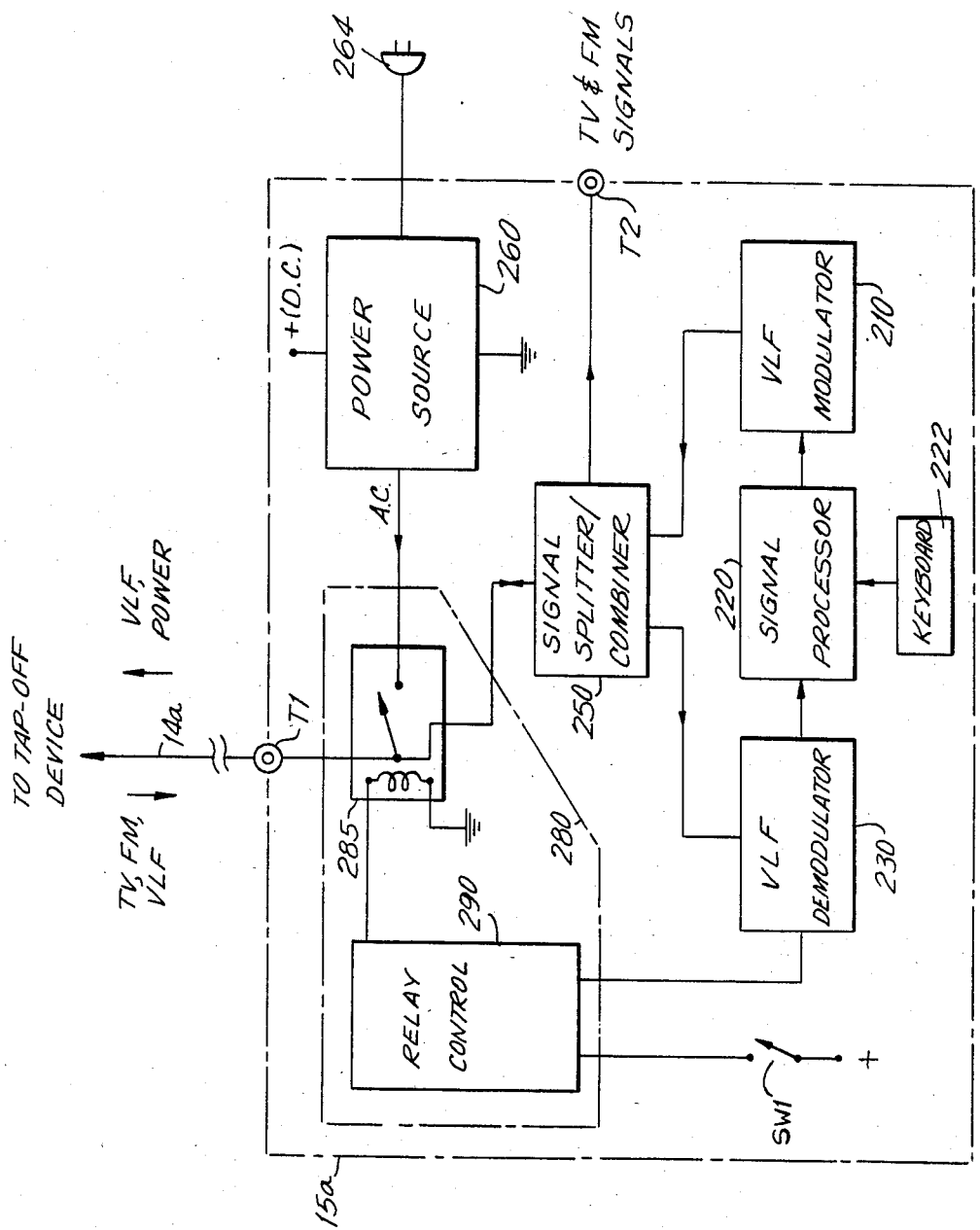
FIG. 5 is an overall block diagram of a subscriber processing unit including a power supply for supplying electrical power to the tap-off device shown in FIG. 1, and including a power safety device according to a first embodiment of the invention.

FIG. 5 shows a block diagram of a subscriber processing unit 15a located on the subscriber's premises which includes a power supply for providing power to tap-off device 12 via attached drop cable 14a, and which further includes a first embodiment of the power safety device of the present invention. The circuitry of the other subscriber processing units 15b, 15c, etc. is identical.

As shown in FIG. 5, drop cable 14a from tap-off device 12 is connected to subscriber processing unit 15a at terminal T1. Drop cable 14a carries television and FM signals from tap-off device 12 to subscriber processing unit 15a, VLF communication signals to and from tap-off unit 12 and subscriber processing unit 15a, and AC power signals from subscriber processing unit 15a to tap-off device 12. Drop cable 14a is connected to signal splitter 250 which splits the various signals carried on drop cable 14a.

One terminal of signal splitter 250 delivers received television and FM signals to terminal T2 to which the subscriber may connect a television receiver and FM tuner. Connected to another terminal of signal splitter 250 is the output of VLF modulator 210. VLF modulator 210 receives data signals from signal processor 220 (representing, e.g., channel selection data input by a subscriber via keyboard 222), and ASK-modulates those data signals onto a 468 KHz VLF carrier signal. The VLF signal produced by VLF modulator 210 passes through signal splitter 250 and onto drop cable 14a for transmission to tap-off device 12. Another terminal of signal splitter 250 carries 410 KHz modulated VLF signal received from tap-off device 12 via drop cable 14a. This 410 KHz VLF signal is applied to VLF demodulator 230, which demodulates the received VLF signal to produce digital data. The digital data are applied from VLF demodulator 230 to signal processor 220. Signal processor 220 processes the received data to control various functions at subscriber processing unit 15a (e.g., a character display (not shown) to inform the subscriber as to which television channel the subscriber has tuned).

Power supply 260 provides power to operate the circuitry of (1) subscriber processing unit 15a, and (2) lap-off device 12. Power supply 260 provides regulated D.C. power ("+") for operating the circuitry of subscriber processing unit 15a, and unregulated AC power (60 volts, 60 Hz) for operating the circuitry of tap-off device 12 via drop cable 14a.

In accordance with the present invention, a first embodiment of power safely device 280 is connected to drop cable 14a and power supply 260 for monitoring the integrity of drop cable 14a and responsively controlling the application of AC power to drop cable 14a. As described below, power safety device 280 operates to rapidly interrupt the application of AC power to drop cable 14a whenever drop cable 14a becomes unconnected from tap-off device 12.

Still referring to FIG. 5, relay 285 of power safety device 280 is interposed between drop cable 14a and power supply 260. AC power from power supply 260 is applied to a first terminal of relay 285, and drop cable 14a is connected to a second terminal of relay 285. Relay 285 is of the normally open type, so that AC power from power supply 260 cannot reach drop cable 14a unless relay 285 is energized. Relay 285 is connected to and energized by relay control 290 of power safety device 280. Relay control 290 also is connected to VLF demodulator 230, and functions to sense the presence and absence on drop cable 14a of the 410 KHz signal transmitted by transmitter 210 of tap-off device 12 (FIG. 4).

Power safety device 280 operates as follows. Assuming that drop cable 14a is intact (i.e., not cut, broken or disconnected) and that relay 285 is energized so that power is applied to drop cable 14a, transmitter 120 of tap-off device 12 transmits the 410 KHz signal to the subscriber's premises via drop cable 14a. The 410 KHz VLF signal is received by VLF demodulator 230 of subscriber processing unit 15a. By way of its connection to VLF demodulator 230, relay control 290 senses the presence of the 410 KHz signal. Relay control 290 interprets this as indicative of drop cable 14a being connected between subscriber processing unit 15a and tap-off device 12. Accordingly, relay control 290 maintains relay 285 in an energized state to cause the continued application of power from subscriber processing unit 15a to drop cable 14a.

However, if drop cable 14a subsequently becomes out, broken or disconnected, the 410 KHz signal from tap-off device 12 cannot reach subscriber processing unit 15a. In this event, the 410 KHz signal is not applied to VLF demodulator 230, and relay control 290 senses the absence of the 410 KHz signal. If relay control 290 senses that the 410 KHz signal is not being received for a first predetermined period of time, relay control 290 interprets this as indicative of a cut, broken or disconnected drop cable 14a and de-energizes relay 285 to interrupt the application of power to drop cable 14a. Thus, if drop cable 14a is at any time cut, broken or disconnected while subscriber processing unit 15a is applying power to drop cable 14a, power safety device 280 senses this and interrupts the application of power to drop cable 14a within the first predetermined period of time.

The aforementioned first predetermined period of time is chosen to satisfy two constraints. First, it must be sufficiently long such that brief interruptions in the transmitted 410 KHz signal (e.g., resulting from data transmissions) are not misinterpreted by relay control 290 as indicative of a cut, broken or disconnected drop cable. Second, it must be sufficiently short such that individuals advertently or inadvertently coming in contact with a cut, broken or disconnected drop cable do not receive a hazardous (i.e., physically injurious or fatal) electrical shock from the 60-volt AC power applied to the drop cable by power supply 260. In the cable television system above-described, about 300 milliseconds has been found to be a suitable first predetermined period of time. Of course, a longer or shorter predetermined period of time may be sufficient or necessary depending on the amount and form of power applied to drop cable 14a by the subscriber. For instance, if drop cable 14a carries less power, or power in a different form (e.g., D.C. power or power having a frequency greater than 60 Hz), a longer predetermined period of time may suitably protect individuals from hazardous electrical shock. Conversely, if drop cable 14a carries more power, a shorter predetermined period of time may be necessary to protect against hazardous electrical shock. In any event, the predetermined period of time must be sufficiently long such that brief interruptions in the signal transmitted from tap-off device 12 not resulting from a cut, broken or disconnected drop cable do not cause relay control 280 to interrupt the application of power to drop cable 14a.

If tap-off device 12 is connected to other subscriber processing units 15b, 15c, etc. via drop cables 14b, 14c, etc. at the time drop cable 14a becomes cut, broken or disconnected, tap-off device 12 continues to receive power from the other subscriber processing units 15b, 15c, etc. and transmitter 120 continues transmitting its 410 KHz signal. Thus, when drop cable 14a is again connected to subscriber processing unit 15a, relay control 280 again senses the 410 KHz signal and re-energizes relay 285 to again apply power to drop cable 14a. However, if tap-off device 12 is not receiving power from other subscriber processing units 15b, 15c, etc. at the time drop cable 14a becomes cut, broken or disconnected, tap-off device 12 no longer receives any power from its associated subscriber premises and transmitter 120 ceases transmitting the 410 KHz signal. This resuts in tap-off device 12 and transmitter 120 remaining in an unpowered state even after drop cable 14a is again connected, because power safety device 280 does not sense any 410 KHz signal and does not re-energize relay 285.

To overcome this problem, relay control 290 further includes reset circuitry to cause an initially unpowered tap-off device 12 to commence transmitting the 410 KHz signal to subscriber processing unit 15a. In the embodiment shown in FIG. 5, relay control 280 is additionally connected to on/off switch SW1 of subscriber processing unit 15a. When switch SW1 is switched, this is sensed by relay control 290 which responsively energizes relay 285 for a second predetermined period of time to cause power to be momentarily applied to drop cable 14a. The power applied to drop cable 14a in response to the switching of switch SW1 is sufficient to power-up transmitter 120 in tap-off device 12 to commence transmitting the 410 KHz signal to subscriber processing unit 15a. If drop cable 14a is intact, the 410 KHz signal is sensed by relay control 290 as earlier described, and relay 285 is maintained in its energized state to cause the continued application of power to drop cable 14a. On the other hand, if drop cable 14a is not intact when switch SW1 is switched, relay control 290 does not sense the 410 KHz signal. In this event, relay control 290 de-energizes relay 285 at the end of the second predetermined period of time to prevent individuals from receiving a hazardous electrical shock.

As earlier described with respect to the first predetermined period of time, the second predetermined period of time must be sufficiently short so as to protect individuals from receiving a hazardous electrical shock if drop cable 14a is not intact, but sufficiently long so that relay control 290 can reliably sense the 410 KHz signal. In addition, the second predetermined period of time must be sufficiently long to enable the previously unpowered tap-off device and transmitter 120 to power-up and commence transmitting the 410 KHz signal to subscriber processing unit 15a. In the above described cable television system, about 300 milliseconds has been found to be a suitable second predetermined period of time. Of course, as with the first predetermined period of time, persons skilled in the art will recognize that the second predetermined period of time may be longer or shorter than 300 milliseconds depending on the particular cable television system in which the invention is used. Also, it will be apparent to those skilled in the art that it is not necessary that the first and second predetermined periods of time be equal to one another.

Figure 6:
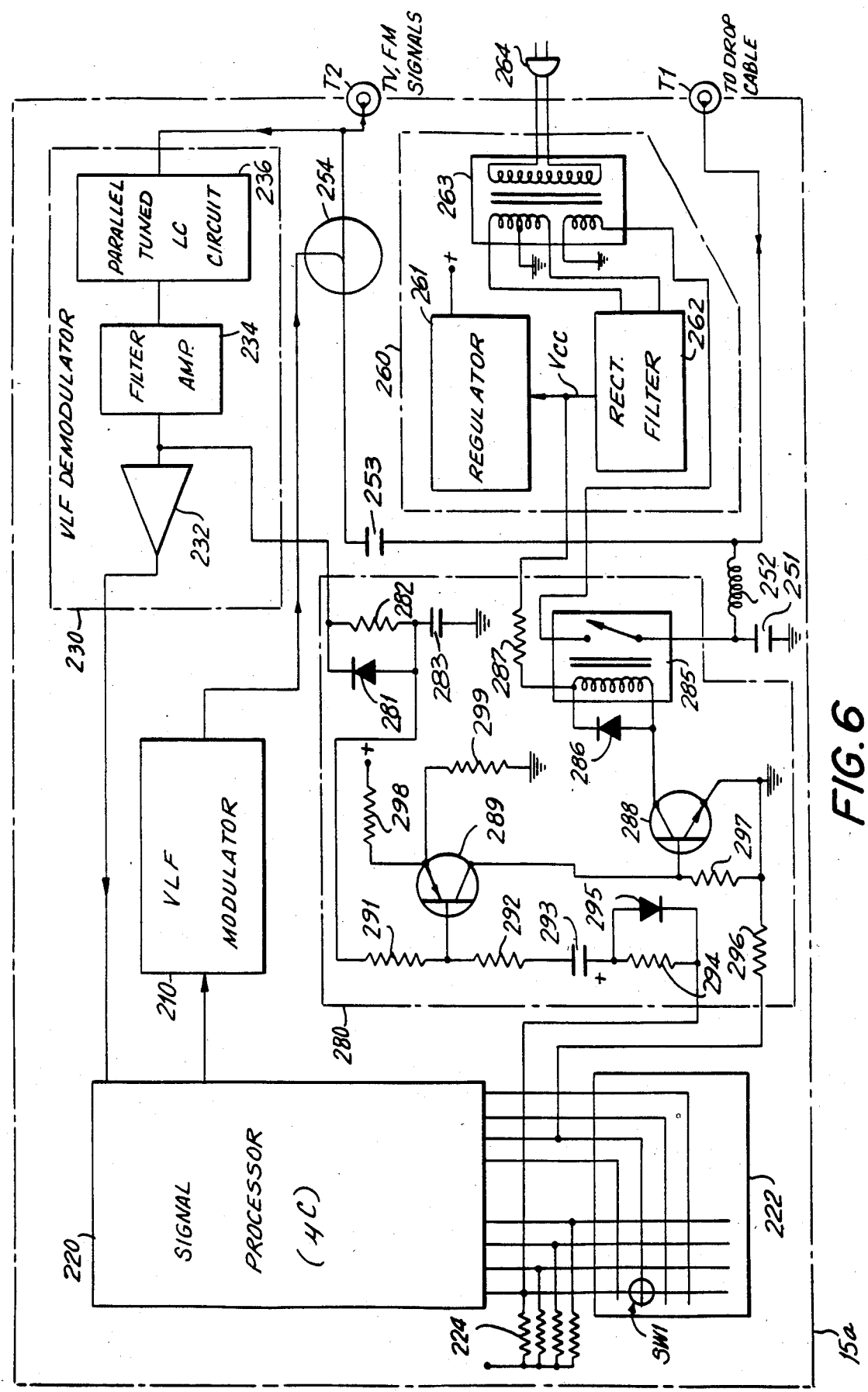
FIG. 6 is a block and circuit diagram of the subscriber processing unit shown in FIG. 5, including a detailed circuit diagram of the first embodiment of the power safety device of FIG. 5.

FIG. 6 shows a detailed circuit diagram of the embodiment of power safety device 280 illustrated in FIG. 5, together with pertinent portions of the circuitry of subscriber processing unit 15a to which power safety device 280 is connected. The same reference numerals in FIGS. 4 and 5 denote the same components in FIG. 6. A further detailed description of those common components not pertinent to an understanding of the present invention will be omitted.

As shown in FIG. 6, subscriber processing unit 15a is connected to drop cable 14a at terminal T1. Drop cable 14a is connected to one terminal of conventional directional coupler 254 through capacitor 253. Capacitor 253 presents a high impedance to 60 Hz AC power signals, but a low impedance to the higher frequency television, FM and VLF signals. Another terminal of directional coupler 254 is connected to terminal T2 to which the subscriber may connect television and FM audio receivers. The terminal of directional coupler 254 connected to terminal T2 is also connected to the input of conventional VLF demodulator 230. As previously described, VLF demodulator 230 receives signals transmitted from tap-off device 12, including television and VLF communication signals. Also as previously described, the communication signal is an ASK-modulated VLF signal having a carrier frequency of 410 KHz. This VLF signal is a substantially continuous signal which is on continuously except when data is being transmitted.

Demodulator 230 demodulates the received 410 KHz signals to produce serial digital data as an output. This is accomplished in the illustrated embodiment by conventional parallel tuned LC circuit 236 which is tuned to 410 KHz and which produces an output signal only in response to the receipt at its input of a 410 KHz signal. Conventional amplifier/filter circuit 234 receives the output of parallel tuned circuit 236 to provide a 410 KHz signal output only when 410 KHz carrier is detected. The output from filter/amplifier 234 is then applied to an input of operational amplifier 232, which produces a digital signal output in response to the presence and absence of a signal from amplifier/filter 234. The digital output of amplifier 232 is then applied to signal processor 220, which can be a conventional microcomputer. Also connected to signal processor 220 is VLF modulator 210. As earlier described, VLF modulator 210 modulates digital data from signal processor 220 and outputs a modulated 468 KHz VLF signal. This signal is applied to a third terminal of directional coupler 254, from which the signal is applied to capacitor 253 and then to terminal T1 for transmission via drop cable 14a to tap-off device 12.

Power supply 260 is shown in FIG. 6 as including conventional transformer 263, conventional rectifier/filter 262 and conventional regulator 261. The primary winding of transformer 263 is connected via plug 264 to a source of subscriber-supplied 120-volt AC power. Transformer 263 includes two secondary windings. A first secondary winding is connected in a conventional way to rectifier/filter 262. Rectifier/filter 262 produces a well-filtered but unregulated DC voltage ("Vcc"). This Vcc voltage is applied to the input of conventional voltage regulator 261. Regulator 261 provides regulated DC power ("+") to power the circuitry of subscriber processing unit 15a. The second secondary winding of transformer 263 is used to provide 60-volt AC power for powering tap-off device 12 via drop cable 14a.

In accordance with the present invention, the 60-volt AC power from transformer 263 is connected to one terminal of single-pole/single-throw, normally open relay 285. The other terminal of relay 285 is connected to drop cable 14a at the junction of capacitor 251 and inductor 252. Thus, as previously described, power from transformer 263 is not applied to drop cable 14a unless relay 285 is energized. Inductor 252 presents a low impedance to AC power signals, but a high impedance to VLF, TV and FM signals. Capacitor 251 shunts to ground any VLF, TV and FM signals which may have entered the power supply circuit.

As earlier described, control of relay 285 is provided by relay control 290. In the illustrated embodiment, relay control circuit 290 is comprised of transistors 288 and 289, resistors 282, 287, 291, 292, 294, 296, 297, 298 and 299, capacitors 283 and 293, and diodes 281 and 295. A detailed description of the circuitry and operation of power safety device 280 follows.

One terminal of the coil of relay 285 is connected via power-limiting resistor 287 to the Vcc output of rectifier filter 262. The other terminal of the coil of relay 285 is connected to the collector of transistor 288. The emitter of transistor 288 is connected to ground, and the base of transistor 288 is connected to the collector of transistor 289. Transistors 288 and 289 cooperatively operate as a switch to energize and de-energize relay 285 as a function respectively of the absence and presence of voltage at the base of transistor 289. If the base of transistor 289 is grounded, transistor 289 conducts current from its collector to its emitter and applies a voltage to the base of transistor 288. This turns on transistor 288, energizes relay 285, and causes AC power to be applied to drop cable 14a. Conversely, if a predetermined voltage is applied to the base of transistor 289, transistors 289 and 288 are turned off, relay 285 is de-energized, and the application of power to drop cable 14a is interrupted. One terminal of resistors 298 and 299 are connected to each other and to the emitter of transistor 289. The other terminal of resistors 298 and 299 are connected respectively to regulated power supply 261 ("+") and to ground. Resistors 298 and 299 function as a voltage divider to establish the emitter of transistor 289 at a predetermined voltage. This voltage in turn estabishes the voltage required at the base of transistor 289 to energize and de-energize relay 285. Diode 286 is connected across the coil of relay 285 to prevent high voltages induced in the coil of relay 285 when relay 285 is de-energized from damaging other components of power safety device 280 and subscriber processing unit 15a.

The state (on or off) of transistor 289, and hence the state (energized or de-energized) of relay 285 is controlled by two circuits: the first comprised of resistors 282 and 291, capacitor 283 and diode 281, and the second comprised of resistors 292, 294 and 296, capacitor 293, and diode 295. The first circuit functions to sense the 410 KHz signal transmitted from tap-off device 12 and, if the transmitted signal is absent from the drop cable for a first predetermined period of time, to cause relay 285 to be de-energized. The second circuit functions to reset power safety device 12. The operation of these circuits is described below.

Referring initially to the first (signal sensing) circuit, one terminal of resistor 291 is connected to the base of transistor 289. The other terminal of resistor 291 is conneoted to a timing circuit comprised of diode 281, resistor 282 and capacitor 283. The timing circuit in turn is connected to VLF demodulator 230. Although the timing circuit can be connected to any of several different points of VLF demodulator 230, a convenient connection point and the point shown in FIG. 6 is the output of filter/amplifier 234. In the embodiment shown in FIG. 6, this output is an analog 410 KHz signal if VLF carrier is being received (i.e., drop cable 14a is intact), and a positive D.C. voltage if no carrier is being received (i.e., drop cable 14a is cut, broken or disconnected). Resistor 282 and capacitor 283 have a time constant approximately equal to the earlier described first predetermined period of time. When the 410 KHz signal is absent because of a cut, broken or disconnected drop cable 14a the D.C. voltage output from filter/amplifier 234 charges capacitor 283 via resistor 282. After the first predetermined period of time, sufficient voltage is applied to the base of transistor 289 (as determined by resistors 298 and 299) to turn off transistor 289 de-energize relay 285. If drop cable 14a is re-connected and the 410 KHz signal is again present, capacitor 283 is rapidy discharged to less than one volt via diode 281. This causes transistor 289 to turn on and energize relay 285, thus causing power to be applied to drop cable 14a.

The second (reset) circuit of power safety device 280 (viz., resistors 292, 294 and 296, diode 295 and capacitor 293) functions as earlier described to reset power safety device 280 in the event drop cable 14a breaks and tap-off device 12 loses all power. One terminal of resistor 296, the cathode terminal of diode 295, and one terminal of resistor 294 are connected to keyboard 222. Keyboard 222 is a conventional matrix membrane keyboard which connects any of four columns to any of four rows depending on which of sixteen switches is pressed. Keyboard 222 may be used by the subscriber to enter channel selection requests, and to turn on and off subscriber processing unit 15a using on/off switch SW1. Keyboard 222 is connected to signal processor 220 in a conventional way. Voltage is applied to each column of keyboard 222 via resistors 224.

As shown in FIG. 6, resistor 296 is connected to row 2 of keyboard 222, and resistor 294 and diode 295 are connected to column 1 of keyboard 222 and to each other. When on/off switch SW1 is pressed, column 1 and row 2 of keyboard 222 are connected together. This connects diode 295 and resistor 294 to ground through resistor 296. As a result, the base of transistor 289 is grounded through resistor 292, capacitor 293, diode 295 and resistor 296. This turns on transistor 289, energizes relay 285, and applies power to drop cable 14a. If drop cable 14a is intact, power is delivered via drop cable 14a to tap-off device 12 and transmitter 120 commences transmitting the 410 KHz signal to subscriber processing unit 15a. When the transmitted 410 Khz signal is received by subscriber processing unit 15a, relay 285 is maintained in an energized state by the first (sensing) circuit comprised of resistors 282 and 291, diode 281 and capacitor 283. However, if the 410 KHz signal is not received because drop cable 14a is cut, broken or disconnected, relay 285 remains energized only for the second predetermined period of time as determined by the time constant formed by a timing circuit comprised of capacitor 293 and resistors 292, 294 and 296. As earlier described, this time constant in the illustrated embodiment is chosen to establish a second predetermined period of time equal to about 300 milliseconds. When switch SW1 is released, voltage applied to the column lines of keyboard 222 through resistor 294 enables capacitor 293 to recharge for another reset cycle.

Figure 7:
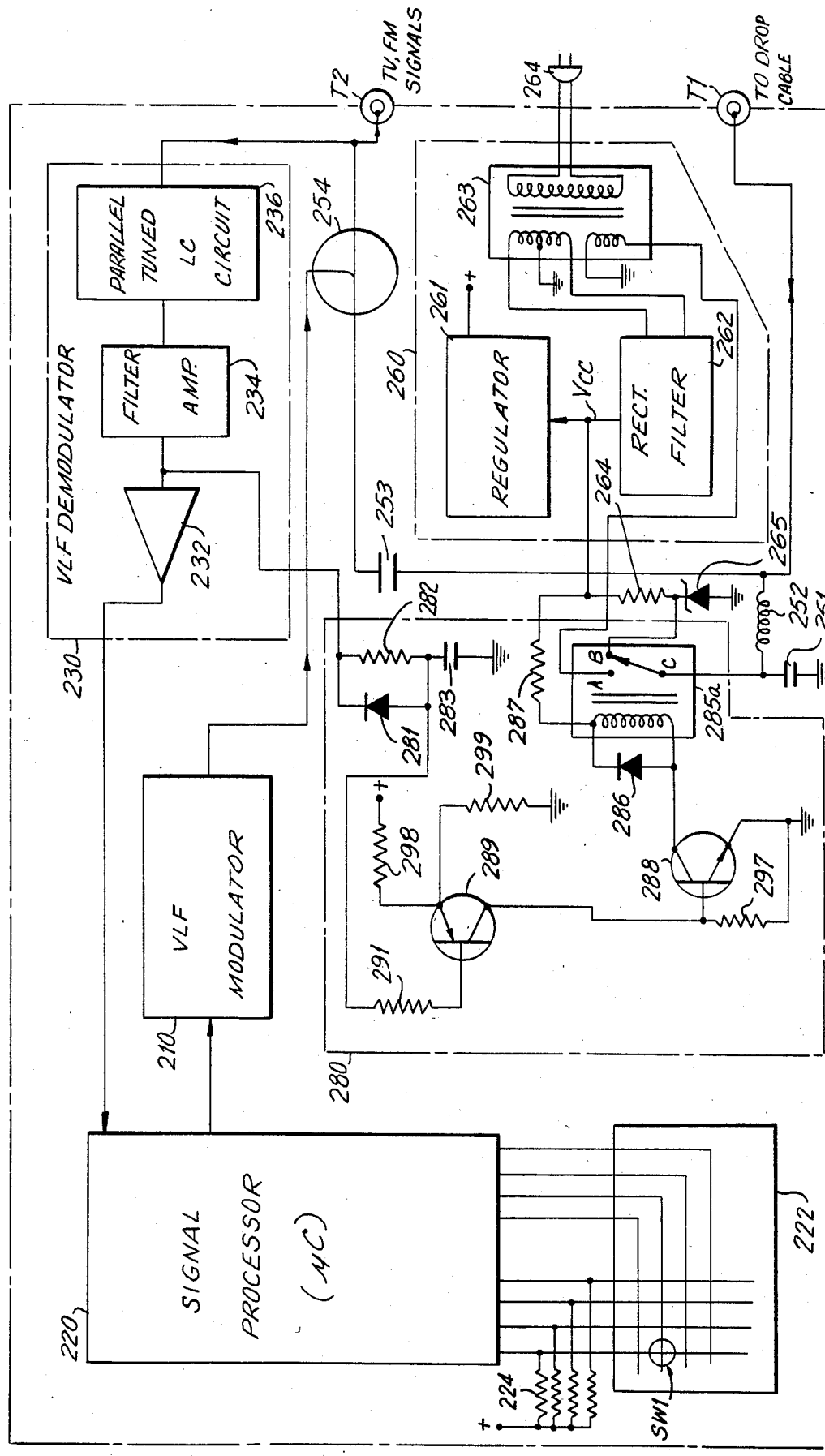
FIG. 7 is a block and circuit diagram of a subscriber processing unit including a detailed circuit diagram of a power safety device according to a second embodiment of the invention.

FIG. 7 shows a second embodiment of the present invention which differs from that shown in FIG. 6 in that the embodiment of FIG. 7 utilizes a second approach to resetting power safety device 280 in the event drop cable 14a becomes cut, broken or disconnected and tap-off device 12 loses all power. In the second embodiment of FIG. 7, instead of resetting power safety device 280 by applying full power to drop cable 14a for a second predetermined period of time, the circuit of FIG. 7 continuously applies an amount of electrical power to cut, broken or disconnected drop cable 14a which is less than an amount which is hazardous but which, nevertheless, is sufficient to at least partially power-up tap-off device 12 to commence transmitting the 410 KHz signal.

As shown in FIG. 7, the reset circuitry of FIG. 6 (resistors 292, 294 and 296, capacitor 293 and diode 295) is deleted, and single-pole/single-throw normally open relay 285 is replaced by single-pole double-throw relay 285a. Relay 285a has a common terminal ("C"), a normally open terminal ("A") and a normally closed terminal ("B"). Terminals A and C of relay 285a are connected as shown in FIG. 7 to transformer 263 and drop cable 14a, respectively. Relay 285a is also connected at terminal B to one terminal of zener diode 265 and one terminal of resistor 264. The other terminal of zener diode 265 is connected to ground, and the other terminal of resistor 264 is connected to the Vcc output of rectifier/filter 262.

The circuitry shown in FIG. 7 operates as follows. As above-described with respect to relay 285 (FIG. 6), relay 285a is (1) energized and applies full power to drop cable 14a as long as drop cable 14a is intact and power safety device 280 senses the 410 KHz signal, and (2) de-energized and interrupts the application of full power to drop cable 14a within the first predetermined period of time after drop cable 14a becomes cut, broken or disconnected and the 410 KHz signal is absent. When relay 285a is de-energized, terminal B of relay 285a is connected to terminal C, thus connecting drop cable 14a to the circuit comprised of resistor 264 and zener diode 265. Resistor 264 and zener diode 265 function as a voltage divider and regulator, and cause a predetermined D.C. voltage (established by zener diode 265) to be applied continuously to drop cable 14a by relay 285a whenever drop cable 14a becomes cut, broken or disconnected. This D.C. voltage is chosen to be sufficiently high so that transmitter 120 of tap-off device 12 is at least partially powered to commence transmitting the 410 KHz signal, yet sufficiently low so that individuals coming in contact with cut, broken or disconnected drop cable 14a do not receive a hazardous electrical shock.

While preferred embodiments of the invention have been set forth for purposes of the disclosure, modification to the disclosed embodiments may occur to those skilled in the art. For example, while the power safety device of the present invention has been disclosed as sensing a 410 KHz signal sent from a transmitter in the external tap-off device, it will of course be understood by those skilled in the art that any type of signal may be transmitted from the tap-off device and detected at the subscriber's premises for controlling the application of power to the drop cable. Thus, the signal may be of any frequency, and may be continuous, substantially continuous, periodic or even aperiodic. The signal may even be a portion of the delivered television signal itself, or a portion of the delivered FM audio signal. The only limiting criterion in this regard is that the transmitted and sensed signal must be such as to timely and reliably indicate to the sensing circuitry on the subscriber's premises that the drop cable has become cut, broken or disconnected so that power may be rapidly interrupted from being applied to the drop cable. It will also be understood by those skilled in the art that the application of power to the drop cable may be interrupted without interposing a relay in series between the subscriber's power supply and the drop cable. Other techniques (e.g., switching off the subscriber's power supply or shorting the power supply to ground) may also effectively be utilized to interrupt the power.

Accordingly, the appended claims are intended to cover all embodiments of the invention and modifications to the disclosed embodiments which do not depart from the spirit and scope of the invention.

What is claimed is:

1. In a cable television system having a tap-off device external to a subscriber premises, the tap-off device connected to the subscriber premises via a drop cable for delivering television signals to the subscriber premises, and the tap-off device including electronic circuitry powered at least in part by a source of subscriber-supplied electrical power which is applied to the drop cable and delivered via the drop cable to the tap-off device, a power safety device comprising:
    first means associated with the tap-off device and connected to the drop cable for transmitting a signal to the subscriber premises via the drop cable;
    second means associated with the subscriber premises for interrupting the application of power to the drop cable; and
    sensing means associated with the subscriber premises for sensing the transmitted signal on the drop cable, said sensing means being connected to said second means and responsive to sensing the absence of the transmitted signal for enabling said second means to interrupt the application of power to the drop cable to protect individuals from receiving a hazardous electrical shock.

2. The power safety device of claim 1, wherein the signal transmitted by said first means is substantially continuous.

3. The power safety device of claim 2, wherein the signal transmitted by said first means is a data signal.

4. The power safety device of claim 1 or claim 2 or claim 3, wherein said sensing means includes a timing means for causing said sensing means to enable said second means only if the transmitted signal is absent for a predetermined period of time, the predetermined period of time being sufficiently short such that the amount of energy applied to the drop cable during the predetermined period of time is not hazardous.

5. The power safety device of claim 1, wherein the second means includes a relay.

6. The power safety device of claim 5, wherein said relay is connected in series between the drop cable and the source of electrical power.

7. The power safety device of claim 1, further comprising:
    reset means associated with the subscriber premises for causing power to be applied to the drop cable to enable said first means to commence transmitting the signal; and
    timing means associated with said reset means for enabling said reset means to cause power to be applied to the drop cable only for a predetermined period of time, the predetermined period of time being sufficiently short such that the amount of energy applied to the drop cable during the predetermined period of time is not hazardous.

8. The power safety device of claim 1, further comprising:
    reset means associated with the subscriber premises for causing electrical power to be applied to the drop cable to enable said first means to commence transmitting the signal; and
    third means associated with said reset means for limiting the electrical power caused to be applied to the drop cable by said reset means to an amount which is not hazardous.

9. The power safety device of claim 8, wherein said third means includes means for limiting the voltage of the electrical power applied to the drop cable.

10. The power safety device of claim 7, wherein said reset means includes a switch means.

11. In a cable television system having a tap-off device external to a subscriber premises, the tap-off device connected to the subscriber premises via a drop cable for delivering television signals to the subscriber premises, and the tap-off device including electronic circuitry powered at least in part by a source of subscriber-supplied electrical power which is applied to the drop cable and delivered via the drop cable to the tap-off device, a method for protecting individuals from electrical shock in the event the drop cable is cut, broken or disconnected, comprising the steps of:
    transmitting a signal from the tap-off device to the subscriber premises via the drop cable;
    sensing the absence of the transmitted signal on the drop cable at the subscriber premises; and
    interrupting the application of electrical power to the drop cable at the subscriber premises in response to sensing the absence of the transmitted signal to prevent individuals from receiving a hazardous electrical shock.

12. The method of claim 11, wherein the transmitted signal is substantially continous.

13. The method of claim 12, wherein the transmitted signal is a data signal.

14. The method of claim 11 or claim 12 or claim 13, further comprising:
    timing the absence of the transmitted signal; and
    enabling said interrupting step to interrupt the application of power to the drop cable only if the transmitted signal is absent for a predetermined period of time, the predetermined time being sufficiently short such that the amount of energy applied to the drop cable during the predetermined period of time is not hazardous.

15. The method of claim 11, further comprising:
    applying reset power to the drop cable to enable said transmitting step to commence; and
    terminating the appication of reset power to the drop cable after a predetermined period of time, the predetermined period of time being sufficiently short such that the amount of energy applied to the drop cable during the predetermined period of time is not hazardous.

16. The method of claim 11, further comprising:

applying reset power to the drop cable to enable said transmitting step to commence; and limiting the reset power applied to the drop cable to an amount which is not hazardous.

17. The method of claim 16, wherein said limiting step includes the step of limiting the voltage of the reset power applied to the drop cable.

* * * * *